;(12) United States Patent
Matsuo et al.

(10) Patent No.: US 8,638,522 B2
(45) Date of Patent: Jan. 28, 2014

(54) INFORMATION RECORDER AND INFORMATION RECORDING METHOD FOR RECORDING DATA AFTER AN OCCURRENCE OF OFF TRACK WRITING

(75) Inventors: Takashi Matsuo, Saitama (JP); Kenji Yoshida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 13/365,049

(22) Filed: Feb. 2, 2012

(65) Prior Publication Data
US 2012/0300341 A1 Nov. 29, 2012

(30) Foreign Application Priority Data
May 24, 2011 (JP) ................... 2011-116266

(51) Int. Cl.
*G11B 5/56* (2006.01)
(52) U.S. Cl.
USPC ...................................... 360/77.02
(58) Field of Classification Search
None
See application file for complete search history.

(56) References Cited

U.S. PATENT DOCUMENTS

| 6,751,042 | B2 * | 6/2004 | Bi et al. ...................... 360/77.02 |
| 7,394,607 | B2 | 7/2008 | Ohno et al. |
| 7,408,731 | B2 | 8/2008 | Uemura et al. |
| 7,423,828 | B2 * | 9/2008 | Emo et al. ........................ 360/60 |
| 7,474,491 | B2 * | 1/2009 | Liikanen et al. ................ 360/75 |
| 7,623,312 | B2 * | 11/2009 | Ehrlich ........................... 360/71 |
| 2010/0278025 | A1 | 11/2010 | Kawamae |

FOREIGN PATENT DOCUMENTS

| JP | 2003-331403 | 11/2003 |
| JP | 2007-073138 | 3/2007 |
| JP | 2007-184015 | 7/2007 |
| JP | 2009-064540 | 3/2009 |

OTHER PUBLICATIONS

Japanese Office Action dated Jul. 17, 2012, filed in Japanese counterpart Application No. 2011-116266, 5 pages (including English translation).

* cited by examiner

*Primary Examiner* — K Wong
(74) *Attorney, Agent, or Firm* — Patterson & Sheridan, LLP

(57) ABSTRACT

According to one embodiment, an information recorder includes: a determination module; a storage module; a reader; and a writer. The determination module determines whether a position of a head for writing data is off a target track of a recording medium. The storage module temporarily stores therein data written by the head. The reader reads, if it is determined that the head is positioned off the target track, first data written in a sector which is considered overwritten by the head positioned off the target track among sectors of an adjacent track adjacent to the target track, from the storage module. The writer writes, if it is determined that the head is positioned off the target track, the first data into a sector positioned later than the sector into which data is written at the time the head is positioned off the target track.

14 Claims, 7 Drawing Sheets

--- CONTROL SIGNAL
— DATA

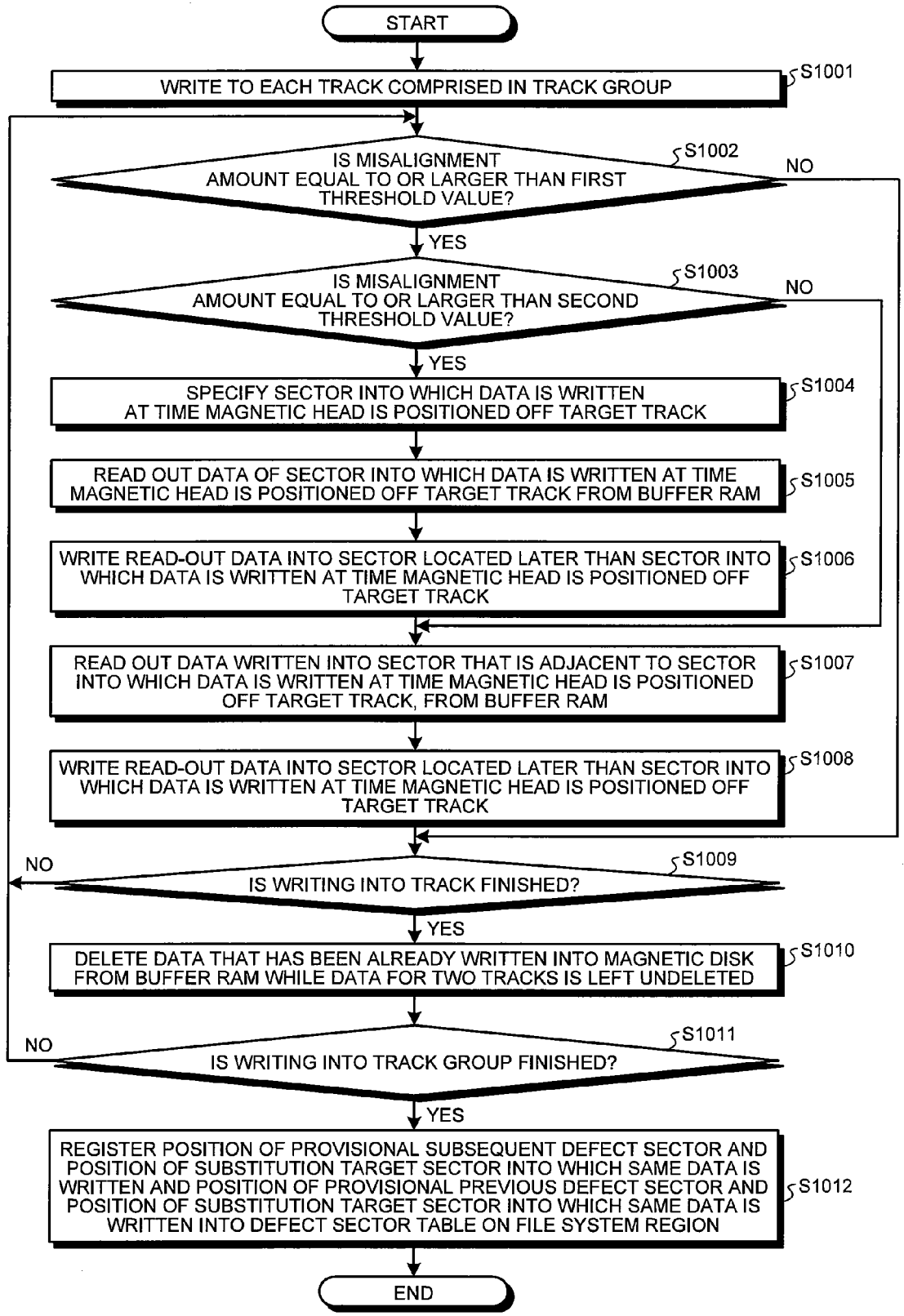

INFORMATION RECORDER AND INFORMATION RECORDING METHOD FOR RECORDING DATA AFTER AN OCCURRENCE OF OFF TRACK WRITING

CROSS-REFERENCE TO RELATED APPLICATIONS

This application is based upon and claims the benefit of priority from Japanese Patent Application No. 2011-116266, filed May 24, 2011, the entire contents of which are incorporated herein by reference.

FIELD

Embodiments described herein relate generally to an information recorder and an information recording method.

BACKGROUND

Conventionally, density of data that is stored in a magnetic disk in a hard disk device tends to be increased. With the increase of data density, a track pitch of the magnetic disk tends to be further made narrower, in recent years.

Upon writing data into such the magnetic disk with a head, if the head is positioned off the target track of the magnetic disk in a direction of an adjacent track in which data is written, it may influence a sector of the adjacent track. As an example of the influence, read performance on the sector is deteriorated; thereby there is a possibility that data cannot be read from the sector in some cases.

Therefore, there is proposed a technique for preventing data written into the adjacent track from being unreadable.

However, in conventional techniques, the same data is rewritten into the adjacent track in which read performance thereof has been deteriorated due to the misalignment of the head with respect to the target track. This requires the head to move to the adjacent track, and so on; thereby resulting in delay.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 10 is an exemplary flowchart of a writing process in the magnetic disk device, in the second embodiment.

DETAILED DESCRIPTION

In general, according to one embodiment, an information recorder comprises: a determination module; a storage module; a reader; and a writer. The determination module is configured to determine whether a position of a head for writing data is off a target track of a recording medium into which the head writes data. The storage module is configured to temporarily store therein data written by the head. The reader is configured to read, if it is determined that the head is positioned off the target track, first data written in a sector which is considered overwritten by the head positioned off the target track among sectors of an adjacent track adjacent to the target track, from the storage module. The writer is configured to write, if it is determined that the head is positioned off the target track, the first data into a sector positioned later than the sector into which data is written at the time the head is positioned off the target track.

Hereinafter, an embodiment of a magnetic disk device to which an information recorder and an information recording method are applied is described in detail with reference to drawings. It is to be noted that embodiments are not limited to embodiments described below.

Figure 1:
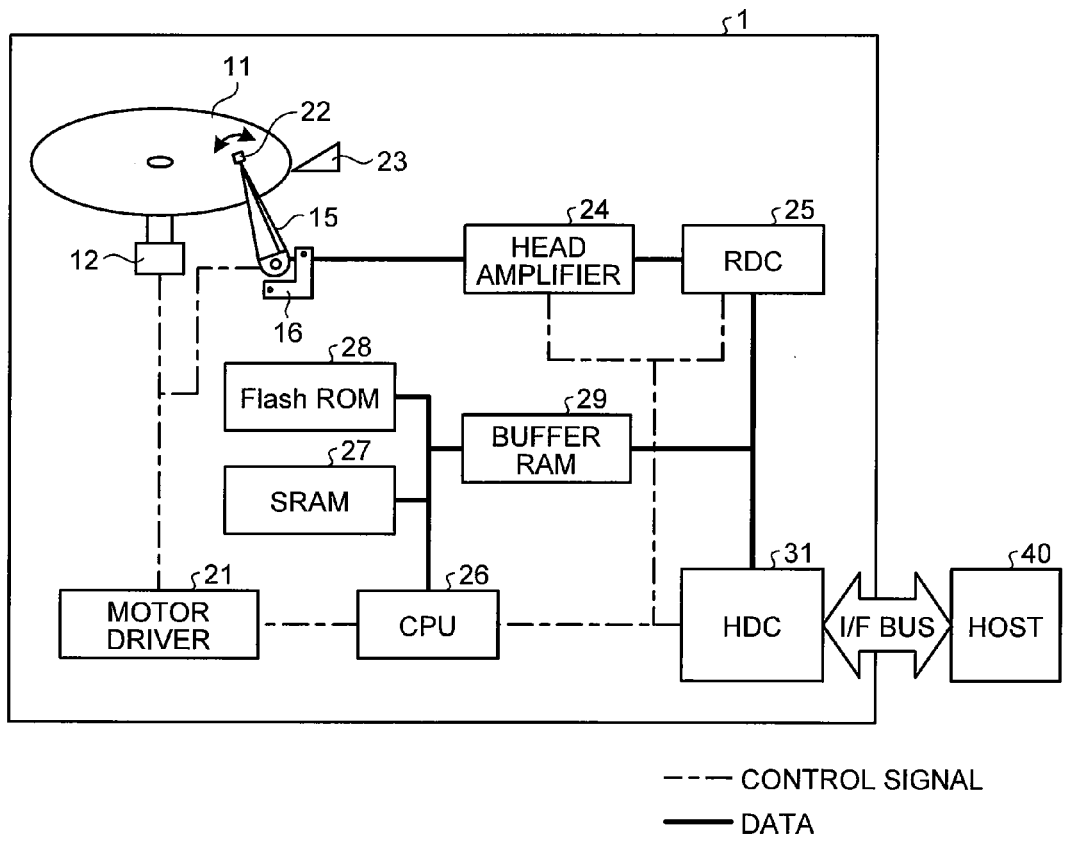
FIG. 1 is an exemplary block diagram of an electric hardware configuration of a magnetic disk device according to a first embodiment.

An electric hardware configuration of a magnetic disk device 1 according to a first embodiment is described with reference to FIG. 1. FIG. 1 is a block diagram illustrating the electric hardware configuration of the magnetic disk device 1 according to the first embodiment.

In FIG. 1, a magnetic disk 11 is rotated about a rotational axis at a predetermined rotational speed by a spindle motor 12. The rotation of the spindle motor 12 is driven by a motor driver 21.

A magnetic head 22 writes data into and reads data from the magnetic disk 11 by a recording head and a reproduction head comprised in the magnetic head 22. Furthermore, the magnetic head 22 is provided at a tip of an actuator arm 15 and is moved in a radial direction of the magnetic disk 11 by a voice coil motor (VCM) 16. The voice coil motor 16 is driven by the motor driver 21. When rotation of the magnetic disk 11 is stopped and so on, the magnetic head 22 is retreated on a ramp 23.

A head amplifier 24 amplifies a signal that has been read out from the magnetic disk 11 by the magnetic head 22, outputs and supplies the signal to a Read Write Channel (RDC) 25. Furthermore, the head amplifier 24 amplifies the signal for writing data into the magnetic disk 11, and supplies the signal to the magnetic head 22. Note that the signal to be amplified by the head amplifier 24 is supplied from the RDC 25.

The RDC 25 modulates a code of data to be written into the magnetic disk 11 and supplies the data to the head amplifier 24. Note that the data to be written into the magnetic disk 11 is supplied from an HDC 31 that will be described later. Furthermore, the RDC 25 demodulates a code of the signal that has been read from the magnetic disk 11 and has been supplied from the head amplifier 24 and outputs the signal to the HDC 31 as digital data.

A Static Random Access Memory (SRAM) 27 as an operation memory, a Flash Read Only Memory (ROM) 28 as a nonvolatile memory, and a buffer RAM 29 for temporal storage are connected to a CPU 26. The CPU 26 entirely controls the magnetic disk device 1 in accordance with firmware that has been previously stored in the Flash ROM 28 and the magnetic disk 11. The firmware is initial firmware and control firmware that is used for normal operation. The control firmware comprises an information recording program that will be described later. It is to be noted that the initial firmware that is executed first at the time of booting is stored in the Flash ROM 28. The control firmware used for normal operation is recorded in the magnetic disk 11. Furthermore, the control firmware is once read out onto the buffer RAM 29 from the magnetic disk 11, and then, is stored in the SRAM 27 with control in accordance with the initial firmware.

The Hard Disk Controller (HDC) 31 controls transmission and reception of data between the HDC 31 and a host computer (Host) 40 through an I/F bus, controls the buffer RAM 29, performs an error correction processing on recording data, and so on. The buffer RAM 29 is used as cache of data that is transmitted and received between the buffer RAM 29 and the host computer 40. Furthermore, the buffer RAM 29 is used for temporarily storing therein data that is read out from the magnetic disk 11, data that is written into the magnetic disk 11, or control firmware that is read out from the magnetic disk 11, and so on.

In recent years, a shingled write recording draws attention as a method of further increasing a capacity of a hard disk. In the shingled write recording, the width of a track of the magnetic disk 11 is narrower than the width of a main magnetic pole of a recording head. Therefore, in the shingled write recording, when data is written with the recording head, partial overwriting is performed on a track into which data is to be written and an adjacent track. When the shingled write recording is applied, the width of the track can be made smaller so that a medium density can be increased.

In the shingled write recording, since partial overwriting is performed on adjacent tracks, data at one side of the adjacent tracks is lost. Therefore, if data on one track is to be updated, the target track cannot only be rewritten, and it is required to rewrite a plurality of tracks all together as a unit. In the first embodiment, a unit comprising the tracks to be rewritten all together is referred to as a track group. A spacing is provided between track groups. Therefore, when data is written into one track group, the data is suppressed from being overwritten into other adjacent track groups. As described above, in the shingled write recording, the number of times of writing into adjacent tracks is suppressed to once. Therefore, adjacent track noise is reduced.

In the magnetic disk device to which the conventional shingled write recording is applied as described above, if data is written into a magnetic disk, writing to a physical sector is performed only once to suppress the influence on the adjacent tracks.

Conventionally, if data is written into the magnetic disk using the above-mentioned shingled write recording and if a magnetic head is positioned off a target track in a direction toward which the writing has already been finished, read performance on a sector into which writing has already been finished may be deteriorated and data may not be able to be read out therefrom. Furthermore, since the writing has already been finished with respect to the sector, there is a possibility that data used to be stored in a buffer is no longer there. Therefore, it has been difficult to rewrite data on the sector on which read performance has possibly been deteriorated due to misalignment (also referred to as off track) of the magnetic head with respect to the target track. Even if rewriting can be performed on the sector, if data is written into one sector twice, partial overwriting is performed. Therefore, the read performance on an adjacent track is also deteriorated. In order not to degrade the read performance, it is sufficient that data is written with respect to a track group from the beginning. However, in this case, a buffer is required to hold all data in the track group at all the time. Thus, more time for the writing is required; thereby resulting in delay.

Thus, in the magnetic disk device 1 according to the first embodiment, a configuration, which will be described later, is employed for solving these problems while the shingled write recording is applied.

In the magnetic disk device 1 according to the embodiment, when the magnetic head 22 performs writing control on a track group, the magnetic head 22 writes data from an inner side to an outer side. That is to say, if data is written into tracks of the track group with the shingled write recording, data on a target track at an inner side thereof adjacent to a track to which the data writing is completed is remain undeleted, and data on the target track at an outer side thereof adjacent to a track to which the data writing is to be performed is deleted.

The buffer RAM 29 temporarily stores therein data written by the magnetic head 22. The buffer RAM 29 according to the first embodiment temporarily stores therein data of sectors comprised in an adjacent track into which data writing has already been finished, at least until finishing data writing to a target track adjacent to the adjacent track in the outer side of the adjacent track. With this, if the magnetic head is positioned off the target track toward the inner side while data is being written into sectors of the target track at the outer side, it is ensured that data of a sector on which read performance has been possibly deteriorated due to the overwriting can be read out from the buffer RAM 29.

Figure 2:
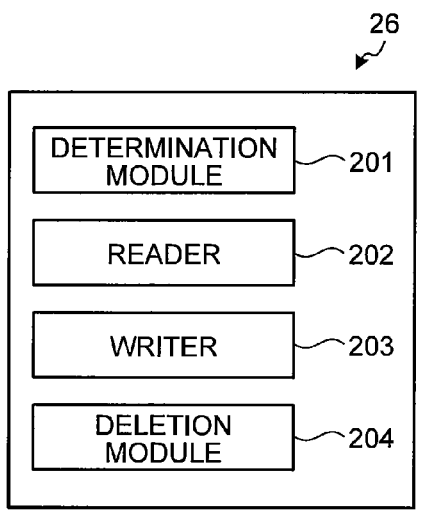
FIG. 2 is an exemplary block diagram of a software configuration that is realized by execution of an information recording program by a central processing unit (CPU) of the magnetic disk device, in the first embodiment.

FIG. 2 is a block diagram illustrating a software configuration that is realized by execution of an information recording program by the CPU 26 of the magnetic disk device 1. As illustrated in FIG. 2, if the CPU 26 of the magnetic disk device 1 boots up the information recording program comprised in the control firmware stored in the Flash ROM 28, a block configuration constituted by a determination module 201, a reader 202, a writer 203, and a deletion module 204 is realized.

The magnetic disk device 1 according to the first embodiment performs writing control on the magnetic disk 11 using the magnetic head 22 when the magnetic disk device 1 receives an instruction of data writing from the host computer 40 connected to the magnetic disk device 1.

The writer 203 performs writing control of data on the magnetic disk 11. The writer 203 according to the first embodiment writes data into a track having a width narrower than the width of a main magnetic pole of the magnetic head 22 that writes the data using the shingle writing when the writer 203 performs the writing control.

Figure 3:
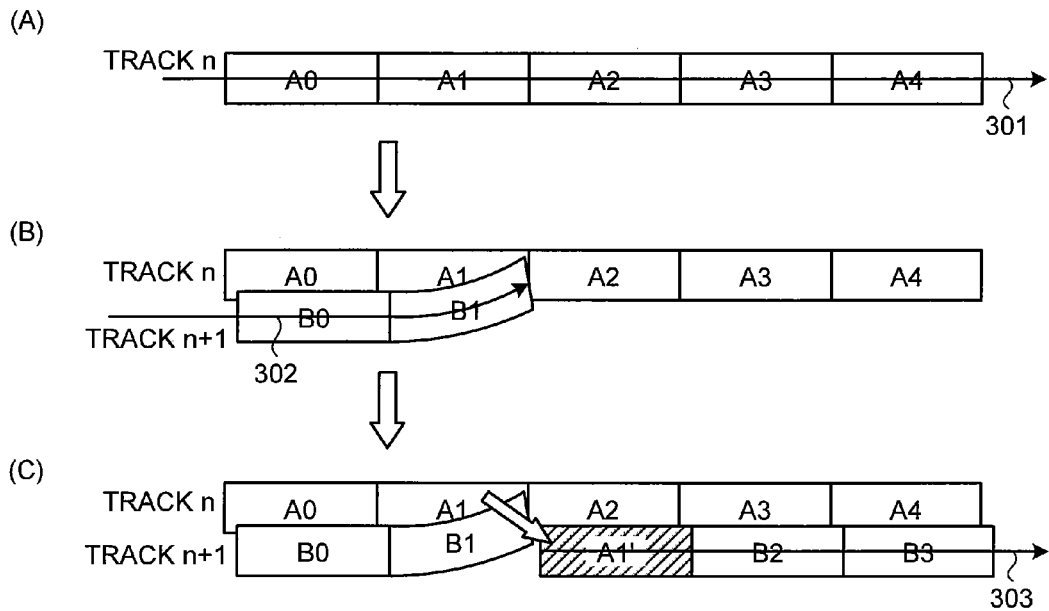
FIG. 3 is an exemplary view illustrating a case of when data is written while a head is positioned off a target track of a magnetic disk in the magnetic disk device, in the first embodiment.

FIG. 3 is a view for explaining an example in which data is written while the magnetic head 22 is positioned off the target track on the magnetic disk 11 in the magnetic disk device 1 according to the first embodiment. FIG. 3(A) illustrates a state where the writer 203 has written data into sectors A0 to A4 of a track n such that the magnetic head 22 draws a movement locus 301.

The determination module 201 determines whether the magnetic head 22 which is writing data is positioned off the target track of the magnetic disk 11 into which the magnetic head 22 is writing the data.

FIG. 3(B) illustrates a state where when the writer 203 writes data into each sector of a track n+1, the magnetic head 22 draws a movement locus 302 and positioned off the target track. In this state, the determination module 201 determines that the magnetic head 22 is positioned off the target track.

The reader 202 reads data from the buffer RAM 29 or the magnetic disk 11. For example, when the determination module 201 determines that the magnetic head 22 is positioned off the target track, the reader 202 reads, from the buffer RAM 29, data that has already been written into a sector but considered overwritten due to the magnetic head 22 being positioned off the target track, from among the sectors comprised in the adjacent track that is adjacent to the target track into which the magnetic head 22 currently writing data.

For example, when the magnetic head 22 is positioned off the target track as illustrated in FIG. 3(B), the reader 202 reads data that has been written into a sector A1 of the track n from the buffer RAM 29.

If it is determined that the magnetic head 22 is positioned off the target track, the writer 203 writes the data read from the buffer RAM 29 by the reader 202 into a sector located at a position later than the sector into which the magnetic head 22 is writing data at the time the magnetic head 22 is positioned off the target track (in other words, into a sector behind the sector at which magnetic head 22 is positioned off the target track).

For example, if the magnetic head 22 is positioned off the target track as illustrated in FIG. 3(C), the writer 203 writes data of the sector A1 that has been read out by the reader 202 into a sector A1' of the track n+1 on a movement locus 303. In this manner, in the first embodiment, the data on the sector on which read performance has been possibly deteriorated is written into a sector subsequent to the sector into which data is being written at the time the magnetic head 22 is positioned off the target track. Here, in the first embodiment, the position of the sector into which the data is written is not limited to the sector subsequent to the sector into which data is being written at the time the magnetic head 22 is positioned off the target track. That is to say, if the buffer RAM 29 holds the data, the data may be written into any sector as long as the target sector is located at a position later than the sector into which data is being written at the time the magnetic head 22 is positioned off the target track and within a track group into which data is being written at the time the magnetic head 22 is positioned off the target track.

The deletion module 204 deletes data from the buffer RAM 29 while data for two tracks among data that has been written into the magnetic disk 11 is left stored. In the example as illustrated in FIG. 3, when the writer 203 starts to write data into a track n+2 after the writer 203 writes data into the track n+1, the deletion module 204 deletes the data on the track n while data on the track n+1 and the track n+2 is left stored on the buffer RAM 29. The deletion module 204 performs such a control, and the data on the track n+1 and the track n+2 that is probably to be read out when the magnetic head 22 is positioned off the target track can be left stored. Furthermore, with the control by the deletion module 204, a storage capacity in the buffer RAM 29 can be reduced.

In the magnetic disk device 1 according to the first embodiment, if the above processing is performed, the sector A1 on which read performance has been possibly deteriorated due to the misalignment of the magnetic head 22 with respect to the target track and the sector A1' as the subsequent track into which the same data as that of the sector A1 is written are present on the magnetic disk 11.

Then, after the writer 203 finishes writing into a track group, the writer 203 registers a sector on which read performance has been possibly deteriorated due to the misalignment of the magnetic head 22 with respect to the target track the off track in the track group, in a defect sector table on a file system region of the magnetic disk 11 as a provisional subsequent defect sector. It is to be noted that a configuration of the defect sector table is the same as a well-known configuration and description thereof is omitted.

Furthermore, the writer 203 registers a position of the sector (hereinafter, referred to as substitution target sector) into which the same data as that in the provisional subsequent defect sector is written in the defect sector table on the file system region. It is to be noted that the deterioration of the read performance on the provisional subsequent defect sector due to the misalignment of the magnetic head 22 with respect to the target track is only a possibility; thereby such a provisional subsequent defect sector is distinguished from a subsequent defect sector from which data in fact could not be read.

Conventionally, if the magnetic head is positioned off the target track while data is being written into a track group of the magnetic disk using the shingled write recording, the writing needs to be stopped in order to determine the read performance of a sector in which data thereof is partially overwritten due to the misalignment of the magnetic head with respect to the target track has been deteriorated; thereby resulting in delay in writing.

In the magnetic disk device 1 according to the first embodiment, although the shingled write recording is used, in order to solve the problem, when the magnetic head is positioned off the target track, a sector in which data thereof is considered partially overwritten due to the misalignment of the magnetic head with respect to the target track is set to a provisional subsequent defect sector, and the same data as that in the provisional subsequent defect sector is written into a substitution target sector of the provisional subsequent defect sector. With this, writing can be suppressed from being delayed since the writing is not required to be stopped. In addition, since the same data as that in the provisional subsequent defect sector is written into the substitution target sector regardless of whether the read performance has been deteriorated, the data written into the provisional subsequent defect sector can be read out even if the read performance has been deteriorated.

Figure 4:
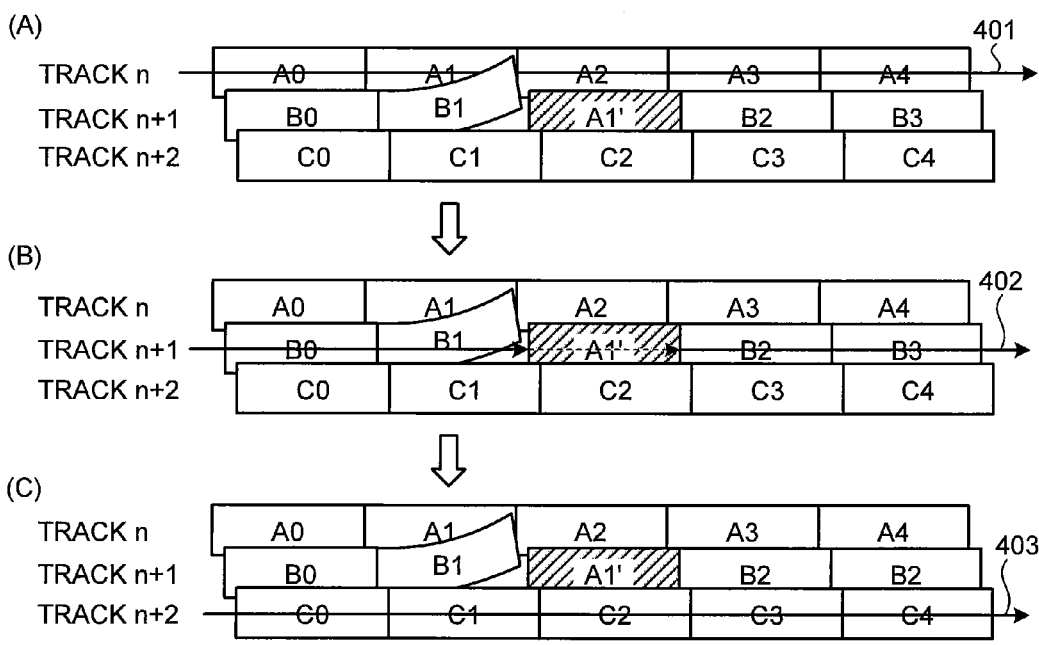
FIG. 4 is an exemplary view illustrating an example of data read control in the magnetic disk device in the first embodiment.

Next, a read-out processing from the magnetic disk 11 in the magnetic disk device 1 according to the embodiment is described. FIG. 4 is a view illustrating an example of data read-out control in the magnetic disk device 1. It is to be noted that since the same data is written into two positions of the sector A1 and the sector A1', it is sufficient that data can be read out from either of the sector A1 or the sector A1' in the magnetic disk device 1. Thus, since there is a possibility that data can be read out from the provisional subsequent defect sector, an example in which the processing is performed in the following procedures is described in the embodiment. In the magnetic disk device 1 according to the embodiment, data can be efficiently read out if the processing is performed in the procedures.

At first, in FIG. 4(A), the reader 202 reads out data from the sectors A0 to A4 of the track n such that the magnetic head 22 draws a movement locus 401. That is to say, when the magnetic head 22 has reached to the provisional subsequent defect sector A1, the reader 202 continuously reads out data on the sectors.

Then, the determination module 201 determines whether data of the substitution target sector A1' should be read out, in accordance with whether data has been successfully read out from the provisional subsequent defect sector A1 during the reading by the reader 202. To be more specific, when the data has been successfully readout from the provisional subsequent defect sector A1, the reader 202 does not read out the data from the substitution target sector A1'. On the other hand, when the data has been failed to be read out, the reader 202 reads out the data from the substitution target sector A1'.

In FIG. 4(B), the reader 202 reads out data from the track n+1 such that the magnetic head 22 draws a movement locus 402. At this time, the reader 202 reads out or does not read out the data from the substitution target sector A1' in accordance with the determination result by the determination module 201. That is to say, when correction or the like is performed so that data can be readout from the provisional subsequent defect sector A1, reading-out of the data from the substitution target sector A1' is not executed. On the other hand, when the data cannot be read out from the provisional subsequent defect sector A1, the reader 202 reads out the data from the substitution target sector A1'.

In the shingled write recording, there has been proposed a cancellation technique for cancelling the interference between adjacent tracks (hereinafter, referred to as inter-track interference), as a technique of reading out data from a sector into which data is partially overwritten. The cancellation of inter-track interference is a technique of canceling interference generated between adjacent tracks on data to be currently read by the magnetic head 22 by using data that has been already read from an adjacent track. If the interference is cancelled, read performance can be improved. In the magnetic disk device 1 according to the embodiment, the cancellation of inter-track interference is used when the reader 202 reads out data from the magnetic disk 11.

The reader 202 according to the first embodiment may read out the data that has been written into the substitution target sector A1' instead of using the data that has been stored in the provisional subsequent defect sector A1 so as to remove inter-track interference. In this case, the reader 202 accesses the defect sector table and reads out a position of the substitution target sector A1'.

In an example as illustrated in FIG. 4(B), when the reader 202 reads out data from a sector B1, the data same as that written into the provisional subsequent defect sector A1 may be used for the cancellation of inter-track interference. As practical procedures, when the reader 202 has successfully read out the data from the provisional subsequent defect sector A1, the data that has been read out from the subsequent defect sector A1 is used for the cancellation of inter-track interference. Furthermore, when the reader 202 has failed to read out the data from the subsequent defect sector A1, the data that has been read out from the substitution target sector A1' is used for the cancellation of inter-track interference.

A case where reading-out of the data from the substitution target sector A1' is not executed since the reader 202 has successfully read the data from the provisional subsequent defect sector A1 and the magnetic head 22 draws a movement locus 403 is described with reference to FIG. 4(C). When the reader 202 reads out data from a sector C1, data that has been read out from the sector B1 is used for the cancellation of inter-track interference. Thereafter, when the reader 202 reads out data from a sector C2, the data that has been read out from the provisional subsequent defect sector A1 is used for the cancellation of inter-track interference since data has not been read out from the substitution target sector A1'.

As described above, in the magnetic disk device 1 according to the embodiment, by using the cancellation of inter-track interference, reproduction performance can be maintained in comparison to a case where a track pitch is not made narrower. Furthermore, in the magnetic disk device 1, the read performance can be improved in comparison to a case where the cancellation of inter-track interference is not used.

In the description above, a method of determining whether the magnetic head is positioned off the target track by the determination module 201 has not been described. Then, the determination method is described. In the determination of the misalignment of the magnetic head with respect to the target track by the determination module 201 according to the embodiment, a servo region (hereinafter, also referred to as servo) recorded in the magnetic disk 11 is used.

Figure 5:
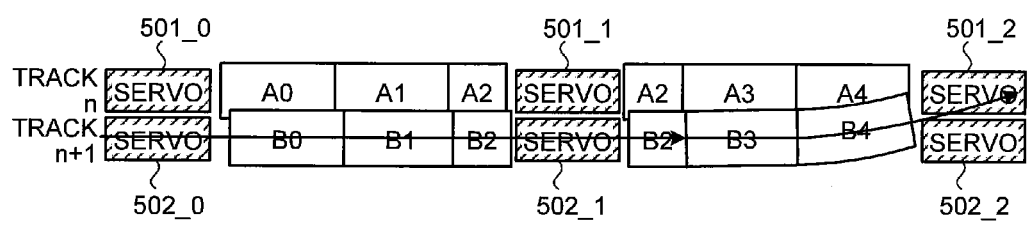
FIG. 5 is an exemplary conceptual diagram illustrating detection of the head which is positioned off the target track, by a servo, in the first embodiment.

FIG. 5 is a view illustrating a concept of detection of the misalignment of the magnetic head with respect to the target track by a servo. As illustrated in FIG. 5, a servo 501_0, a servo 501_1, and a servo 501_2 are set on the track n. Furthermore, a servo 502_0, a servo 502_1, and a servo 502_2 are set on the track n+1.

When the reader 202 read servo data from the servo by using the magnetic head 22, the determination module 201 determines whether a position of the magnetic head 22 is normal based on the read servo data. That is to say, the determination module 201 determines whether the magnetic head 22 is positioned off the target track based on whether an amount of misalignment between the head position specified from the servo data and the target track into which data is being written is larger than a threshold value. Then, when the determination module 201 determines that the amount of misalignment is smaller than the threshold value, it is determined that the magnetic head 22 is not positioned off the target track at that time. Furthermore, it is assumed that data has properly been written into sectors until that time. That is to say, when the determination module 201 determines that the amount of misalignment is smaller than the threshold value by using servo data of the servo 502_1, it is determined that data has properly been written into sectors B0, B1, and B2.

On the other hand, when the determination module 201 determines that the amount of misalignment is equal to or larger than the threshold value, it is determined that the magnetic head 22 is positioned off the target track at that time. That is to say, sectors of an inner track adjacent to sectors into which data writing since the previous determination has been finished are set to provisional subsequent defect sectors. For example, when it is determined that the head position is not normal by servo data of the servo 501_2, the sectors A2, A3, and A4 of the inner track that is adjacent to the sectors into which data writing from the servo 502_1 to the servo 502_2 has been finished are set to the provisional subsequent defect sectors. It is to be noted that the processing after the provisional subsequent defect sectors are set are the same as the above-mentioned processing.

In the magnetic disk device 1 according to the embodiment, a case where recording is performed with the shingled write recording on the magnetic disk 11 constituted by the above-mentioned track group has been described. However the embodiment is not limited to the case using the shingled write recording. The above-mentioned processing can be applied as long as a recording method with which there arises a possibility that data is overwritten on an adjacent track due to misalignment of a magnetic head with respect to a target track is employed.

Figure 6:
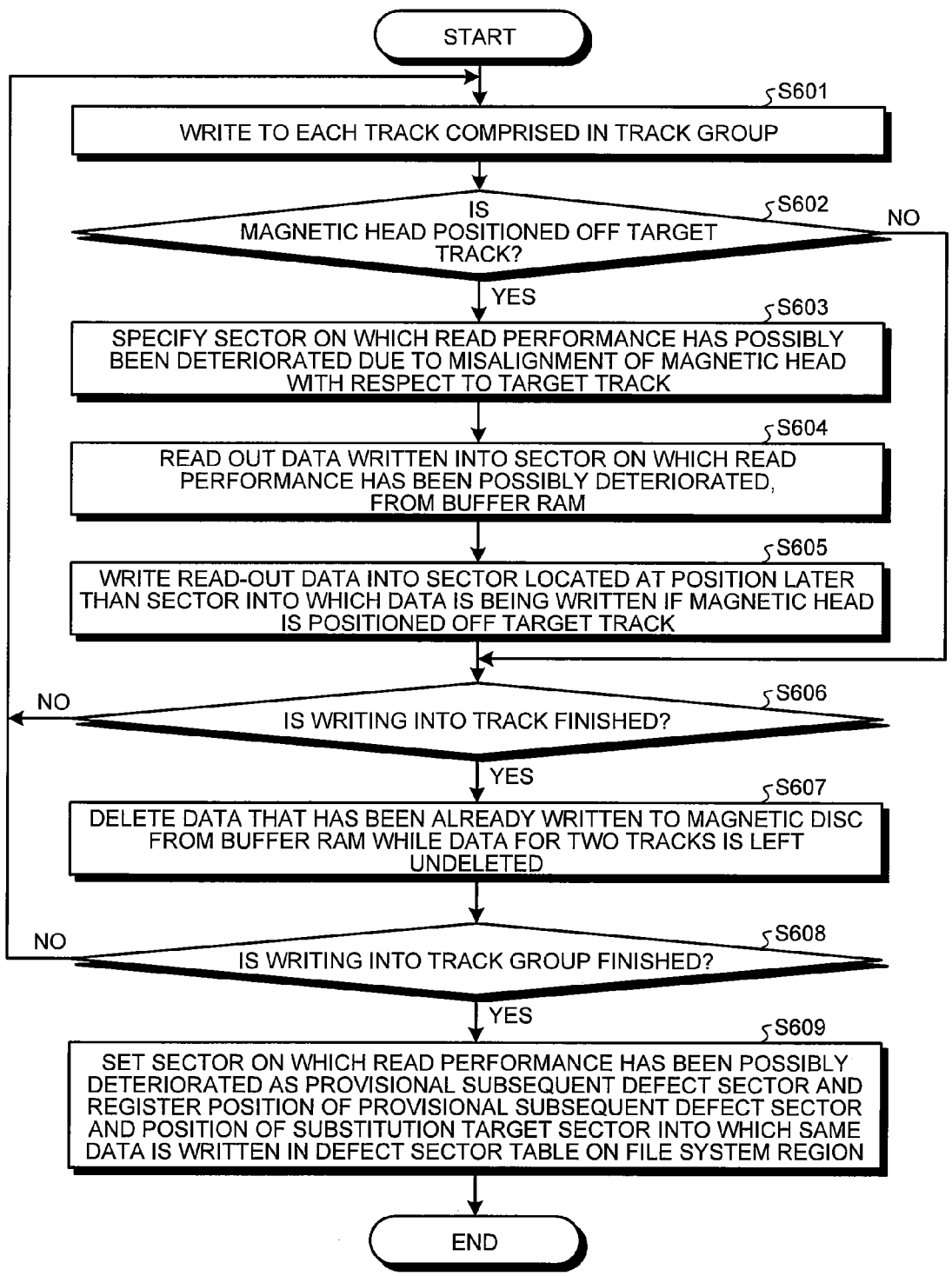
FIG. 6 is an exemplary flowchart of a writing processing in the magnetic disk device in the first embodiment.

Next, a writing processing in the magnetic disk device 1 according to the embodiment is described. FIG. 6 is a flowchart illustrating procedures of the above-mentioned processing in the magnetic disk device 1 according to the embodiment.

The writer 203 performs writing control for each track comprised in a track group (S601). Next, the determination module 201 determines whether the magnetic head 22 is positioned off the target track into which data is being written (S602). When the determination module 201 determines that the magnetic head 22 is not positioned off the target track (No at S602), the processing proceeds to S606.

On the other hand, when the determination module 201 determines that the magnetic head 22 is positioned off the target track (Yes at S602), the determination module 201 specifies a sector on which read performance has possibly been deteriorated due to the misalignment of the magnetic head 22 with respect to the target track based on the servo (S603).

Thereafter, the reader 202 reads data that is written in the sector on which read performance has possibly been deteriorated from the buffer RAM 29 (S604).

Next, the writer 203 writes the read data into a sector located at a position behind the sector into which data is being written when the magnetic head 22 is positioned off the target track (S605). The sector into which data is written is referred to as the substitution target sector.

Then, the deletion module 204 determines whether writing into the track has been finished (S606). When the deletion module 204 determines that writing into the track has not been finished (No at S606), the processing by the deletion module 204 is not performed and writing at S601 is continuously performed.

On the other hand, when the deletion module 204 determines that writing into the track has been finished (Yes at S606), the deletion module 204 deletes data that is stored in the buffer RAM 29 and has been already written into the magnetic disk 11, while data for two tracks is left stored (S607).

Thereafter, the writer 203 determines whether writing into the track group has been finished (S608). When the writer 203 determines that writing into the track group has not been finished (No at S608), writing at S601 is continuously performed.

On the other hand, when the writer 203 determines that writing into the track group has been finished (Yes at S608), the writer 203 sets a sector on which read performance has possibly been deteriorated due to the misalignment of the magnetic head 22 with respect to the target track to a provisional subsequent defect sector, and registers a position of the provisional subsequent defect sector and a position of a substitution target sector into which the same data is written in the defect sector table on the file system region (S609). It is to be noted that the position of the provisional subsequent defect sector and the position of the substitution target sector are temporarily stored in the buffer RAM 29 until the positions are registered (written) at S609.

The writing processing in the magnetic disk device 1 is ended with the above-mentioned processing procedures. In the magnetic disk device 1 according to the embodiment, if the above-mentioned writing processing is performed, data that is stored in the sector on which read performance has been deteriorated due to the misalignment of the magnetic head 22 with respect to the target track can be written into the substitution target sector without stopping writing into the track group so as to read out the data.

In the magnetic disk device 1 according to the first embodiment, writing control is performed on the track group of the magnetic disk 11 so as to move from the inner side to the outer side. However, writing procedures are not limited thereto and writing control may be performed so as to move from the outer side to the inner side of the magnetic disk 11, for example. In this case, writing control into the substitution target sector is performed when the magnetic head is positioned off the target track at the outer side.

Furthermore, in the first embodiment, the buffer RAM 29 holds data for two tracks, and the deletion module 204 deletes the data that already written in the tracks at the inner side when the data writing by the writer 203 is appropriately completed for one track. However, the embodiment is not limited to the method. For example, the buffer RAM 29 may hold data of equal to or larger than two tracks all the time. Furthermore, the deletion module 204 may delete data that has been written into sectors of an inner adjacent track of sectors to a servo region from the buffer RAM 29 every time the writing position is determined to be normal on the servo region of the magnetic disk 11.

Furthermore, in the magnetic disk device 1, if data is required to be written into the substitution target sector upon occurrence of the misalignment of the magnetic head with respect to the target track at the inner side, the buffer RAM 29 may hold data that has been written into the sector of the inner adjacent track until the data is written into the substitution target sector. In this case, the deletion module 204 deletes the data from the buffer RAM 29 when the writer 203 reads out the data and writes the data into the substitution target sector.

In addition, in the first embodiment, the substitution processing of the provisional subsequent defect sector is performed on a sector immediately after a sector into which data is being written at the time the magnetic head is positioned off the target track. However, the substitution processing may be performed on any sector as long as the sector is located at a position later than the sector into which data is being written at the time the magnetic head is positioned off the target track in the same track group. Furthermore, the writer 203 may write data that is written in the sector on which read performance has been deteriorated into a data storage region that is separately provided, not into the same track group.

In the magnetic disk device 1 according to the first embodiment, control is performed in consideration of a case where read performance of an adjacent sector has been deteriorated due to misalignment of a magnetic head with respect to a target track. However, when a misalignment amount between a position of the magnetic head 22 and a sector into which data is being written is larger due to the misalignment, there is a possibility that the read performance on the sector into which data is being written is also deteriorated. Thus, in a second embodiment, data of the sector into which data is being written at the time the magnetic head is positioned off the target track is also written into a substitution target sector. It is to be noted that an electric hardware configuration of a magnetic disk device according to the second embodiment is the same as that of the magnetic disk device 1 according to the first embodiment and description thereof is omitted.

Figure 7:
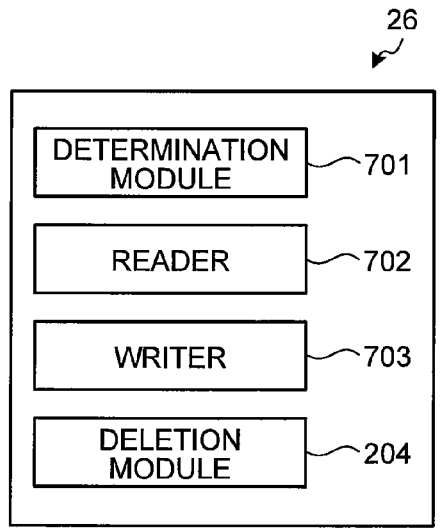
FIG. 7 is an exemplary block diagram of a configuration of an information recording program executed by a CPU of a magnetic disk device according to a second embodiment.

FIG. 7 is a block diagram illustrating a configuration of an information recording program by the CPU 26 of the magnetic disk device 1 according to the second embodiment. As illustrated in FIG. 7, when the CPU 26 according to the second embodiment executes the information recording program, a determination module 701, a reader 702, and a writer 703 whose processing is different from those of the determination module 201, the reader 202, and the writer 203 are operated in a manner different from the above-mentioned first embodiment. In the following, the same reference numerals denote the same components as those in the above-mentioned first embodiment and description thereof is omitted.

The determination module 701 determines whether the misalignment amount of the magnetic head 22 with respect to the target track toward the inner side is equal to or larger than the previously defined threshold value for the determination of writing failure, in addition to the processing performed by the determination module 201 in the first embodiment.

That is to say, the determination module 701 according to the second embodiment has a first threshold value for determining whether the magnetic head 22 is positioned off the target track and a second threshold value for determining whether writing has failed due to the misalignment, as determination of the misalignment toward the inner side. It is to be noted that the first threshold value is set to be smaller than the second threshold value.

Then, the determination module 701 determines that no misalignment has occurred if the misalignment amount is smaller than the first threshold value. Furthermore, if the misalignment amount is equal to or larger than the first threshold value and is smaller than the second threshold value, the determination module 701 determines that writing that is currently being performed is normal but the magnetic head 22 is positioned off the target track. The processing performed in this case is the same as that in the first embodiment.

Furthermore, the determination module 701 determines that the writing that is currently being performed is also probably failed when the misalignment amount is equal to or larger than the second threshold value.

Figure 8:
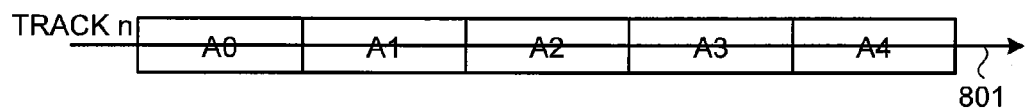
FIG. 8 is an exemplary view for explaining a case of when data is written while a head is positioned off a target track of a magnetic disk in the magnetic disk device, in the second embodiment.
Figure 8:
Figure 8:
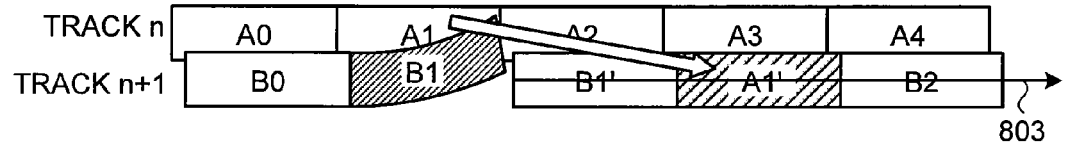

FIG. 8 is a view for explaining an example in which data is being written when the magnetic head 22 is positioned off the target track on the magnetic disk 11 in the magnetic disk device 1 according to the second embodiment. In FIG. 8(A), the writer 703 writes data into the sectors A0 to A4 of track n such that the magnetic head 22 draws a movement locus 801. In FIG. 8(B), when the writer 703 writes data into each sector of the track n+1, the magnetic head 22 draws a movement locus 802 thus the magnetic head 22 is positioned off the target track. In this case, the determination module 701 determines whether the misalignment amount is equal to or larger than the first threshold value and is equal to or larger than the second threshold value. In an example as illustrated in FIG. 8(B), it is determined that the misalignment amount is equal to or larger than the second threshold value.

When the determination module 701 determines that the misalignment amount is equal to or larger than the second threshold value, the reader 702 reads data that is being written into a sector at the time the magnetic head 22 is positioned off the target track, from the buffer RAM 29, in addition to the processing performed by the reader 202 in the first embodiment.

When the determination module 701 determines that the misalignment amount is equal to or larger than the second threshold value, the writer 703 writes the aforementioned data read out by the reader 702 from the buffer RAM 29 into a sector that is located at a position later than the sector into which data is being written at the time the magnetic head 22 is positioned off the target track, in addition to the processing performed by the writer 203 in the first embodiment.

For example, as indicated by a movement locus 803 in FIG. 8(C), if the misalignment amount is equal to or larger than the second threshold value, the writer 703 writes data of a sector B1 that has been read out by the reader 702 into a subsequent sector B1' of the track n+1. Thereafter, in the same manner as the first embodiment, the writer 703 writes data of a sector A1 that has been read out by the reader 702 into a subsequent sector A1'. It is to be noted that in the second embodiment, the sector B1 at which the misalignment of equal to or larger than the second threshold value has occurred is referred to as a "provisional previous defect sector."

Furthermore, the writer 703 writes and registers the provisional previous defect sector into the file system region of the magnetic disk 11 after data is written into the track group. In addition, the writer 703 registers a position of the sector into which the same data as that in the provisional previous defect sector is written again as a substitution target of the provisional previous defect sector in the defect sector table on the file system region.

Thus, in the embodiment, when the misalignment of equal to or larger than the second threshold value has occurred, data of the provisional previous defect sector that is being written at the time the magnetic head 22 is positioned off the target track is written into a subsequent sector. However, the position of the sector into which data is written is not limited to the sector in the embodiment. That is to say, if the buffer RAM 29 holds the data, the data may be written into any sector as long as the sector is located at a position later than the sector into which data is being written at the time the magnetic head 22 is positioned off the target track in a track group into which data is being written at the time the magnetic head 22 is positioned off the target track.

Figure 9:
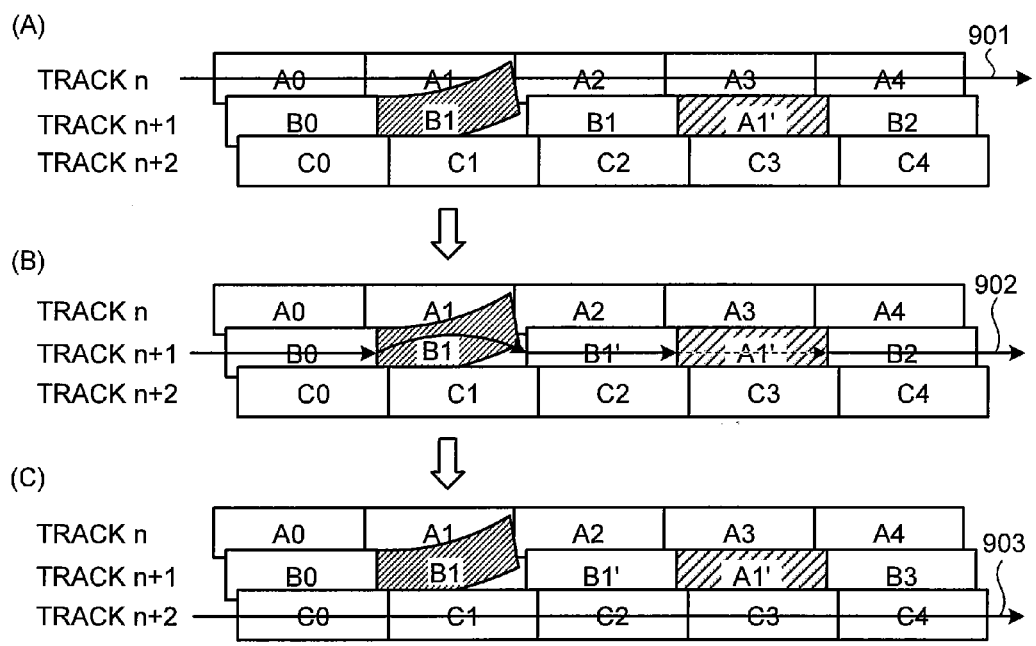
FIG. 9 is an exemplary view illustrating an example of data read control in the magnetic disk device, in the second embodiment.

FIG. 9 is a view illustrating an example of data read-out control in the magnetic disk device 1 according to the second embodiment. At first, in FIG. 9(A), the reader 702 reads out data from the sectors A0 to A4 of the track n such that the magnetic head 22 draws a movement locus 901. That is to say, when the magnetic head 22 has reached the provisional subsequent defect sector A1, the reader 702 continuously reads out data of the sectors. The control in this case is the same as that in the first embodiment and description thereof is omitted.

In FIG. 9(B), the reader 702 reads out data from the track n+1 such that the magnetic head 22 draws a movement locus 902. In this case, the reader 702 does not read data from the provisional previous defect sector B1, and instead reads the data from the substitution target sector B1'. It is to be noted that the data read-out control is performed on the substitution target sector A1' only when the data cannot be read out from the provisional subsequent defect sector A1 in the same manner as that in the first embodiment.

It is to be noted that in the second embodiment, when the reader 702 reads out data, the cancellation of inter-track interference is also used. In an example as illustrated in FIG. 9(C), when the reader 702 reads out data from a sector C1 on a movement locus 903, data that has been read out from the substitution target sector B1' is used for the cancellation of inter-track interference. In addition, when the reader 702 reads out data from a sector C2, the data that has been read out from the substitution target sector B1' is used therefor. It is to be noted that when data is read out from a sector C3, the processing is performed in the same manner as that in the first embodiment.

Next, a writing processing in the magnetic disk device 1 according to the second embodiment is described. FIG. 10 is a flowchart illustrating the above-mentioned processing in the magnetic disk device 1 according to the second embodiment.

The writer 703 performs writing control for each track comprised in a track group (S1001). Next, the determination module 701 determines whether a misalignment amount between a target track into which data is being written and a position of the magnetic head 22 is equal to or larger than the first threshold value, in other words, whether the misalignment has occurred (S1002). If the determination module 701 determines that the magnetic head 22 is not positioned off the target track (No at S1002), the processing proceeds to S1009.

On the other hand, if the determination module 701 determines that the magnetic head 22 is positioned off the target track (Yes at S1002), the determination module 701 determines whether the misalignment amount is equal to or larger than the second threshold value (S1003). If the determination module 701 determines that the misalignment amount is smaller than the second threshold value (No at S1003), the processing proceeds to S1007.

On the other hand, if the determination module 701 determines that the misalignment amount is equal to or larger than the second threshold value (Yes at S1003), the determination module 701 specifies a sector into which data is being written at the time the magnetic head 22 is positioned off the target track (S1004). It is to be noted that as the sector specifying method, a method of specifying sectors stored between servos, which is the same as that in the first embodiment, is employed.

Thereafter, the reader 702 reads out data in the sector into which data is being written at the time the magnetic head 22 is positioned off the target track, from the buffer RAM 29 (S1005).

Next, the writer 703 writes the read data into a sector located at a position later than the sector into which data is being written at the time the magnetic head 22 is positioned off the target track (S1006). The sector into which data is written is referred to as "substitution target sector."

Thereafter, the reader 702 reads out data of a sector that is adjacent to the sector into which data is being written at the time the magnetic head 22 is positioned off the target track (S1007).

As for subsequent processing, writing of data into the track and deletion of data from the buffer RAM 29 are performed with the processing that are the same as those in S605 to S608 in FIG. 6 (S1008 to S1011).

Then, at S1012, the writer 703 registers, in the defect sector table on the file system region, a position of a provisional previous defect sector and a position of a substitution target sector into which the same data as that in the provisional previous defect sector is written. Further, the writer 703 registers, in the defect sector table on the file system region, a position of the provisional subsequent defect sector and a position of the substitution target sector into which the same data as that in the provisional subsequent defect sector is written.

The writing processing in the magnetic disk device 1 is ended with the above-mentioned processing. In the magnetic disk device 1 according to the second embodiment, the above-mentioned writing processing is performed, so that data in the sector into which data is being written at the time the magnetic head 22 is positioned off the target track can be written into the substitution target sector; thereby enabling the readout of the data.

It is to be noted that in the second embodiment, only the substitution target sector B1' of the provisional previous defect sector B1 and the substitution target sector B1' is read. However, the embodiment is not limited to such reading. Alternatively, a configuration in which data is read from both of the provisional previous defect sector B1 and the substitution target sector B1' and either of them is used may be employed.

It is to be noted that in the second embodiment, the determination is performed at two stages of the first threshold value and the second threshold value. However, the determination is not limited to be performed at the two stages. For example, both of the provisional previous defect sector and the provisional subsequent defect sector may be set if the misalignment amount is larger than the first threshold value.

As described above, according to the first and second embodiments, if the magnetic head 22 is positioned off a target track toward a recorded track direction, data on a sector on which read performance has possibly been deteriorated due to overwriting is written into a substitution target sector that is separately provided. Therefore, a possibility that the data cannot be read out can be reduced without performing writing control again on a region on which data has been written once. Furthermore, the writing control is not required to be performed again, thereby suppressing delay due to the writing control.

It is to be noted that in the first and second embodiments, the shingled write recording is used for control when data is written into the magnetic disk 11 in the magnetic disk device 1. However, the embodiment is not limited to such writing control. That is to say, the above processing can be applied to any recording method as long as read performance on the adjacent sector is probably deteriorated due to the misalignment of the magnetic head with respect to the target track when data is written into the magnetic disk 11 with the recording method.

Furthermore, a target on which writing control is to be performed is not limited to the magnetic disk 11, and the writing control can be performed on an optical disk medium into which data can be written.

It is to be noted that the information recording program executed by the CPU 26 of the magnetic disk device 1 according to the embodiment is provided by being previously incorporated in the Flash ROM 28.

The information recording program executed by the CPU 26 of the magnetic disk device 1 according to the embodiment may be configured to be provided by being recorded in a recording medium that can be read by a computer, such as a CD-ROM, a flexible disk (FD), a CD-R, or a Digital Versatile Disk (DVD), as a file in a format that can be installed or a format that can be executed.

Furthermore, the information recording program executed by the CPU 26 of the magnetic disk device 1 according to the embodiment may be configured to be provided by being stored on a computer connected to a network such as the Internet and being downloaded through the network. Alternatively, the information recording program executed by the CPU 26 of the magnetic disk device 1 according to the embodiment may be configured to be provided or distributed through a network such as the Internet.

The information recording program executed by the CPU 26 of the magnetic disk device 1 according to the embodiment has a module configuration comprising the above-mentioned parts (determination module, reader, writer, and deletion module). The CPU 26 reads out the information recording program from the Flash ROM 28 and executes the information recording program, so that the above-mentioned parts are loaded on a main storage device. With this, the determination module, the reader, the writer, and the deletion module are generated on the main storage device as practical hardware.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information recorder comprising:
a recording medium configured to have data written thereon;
a storage module configured to store data;
a controller; wherein the controller is configured to:
determine whether a position of a head for writing data on the recording medium is off a target track of the recording medium into which the head writes data, based on whether an amount of misalignment between a position of the head indicated by servo data associated with the target track and the target track is larger than a threshold value;
temporarily store in the storage module a data block that is written into a track adjacent to the target track;
read from the storage module, if it is determined that the head is positioned off the target track, the data block that was written in a sector that is among one or more sectors of the track adjacent to the target track that are overwritten as a result of the misalignment; and
write, if it is determined that the head is positioned off the target track, the data block into a sector that is different from the sector into which data are written at the time the head is positioned off the target track.

2. The information recorder of claim 1, wherein
the recording medium comprises a track group in which track width is smaller than a width of the head and in which, when data are written into the target track with the head, data are overwritten in a portion of a track adjacent to the target track at an inner side or an outer side of the track adjacent to the target track in a circumferential direction, and
the controller is further configured to write, if it is determined that the head is positioned off the target track, the data block read by the reader into a sector of a track included in the track group to which data is written at the time the head is positioned off the target track.

3. The information recorder of claim 1, wherein
the controller is configured to further read, if it is determined that the head is positioned off the target track, a second data block written in a sector of the target track at the time the head is positioned off the target track, from the storage module, and
to further write, if it is determined that the head is positioned off the target track, the second data block into a sector of the track adjacent to the target track.

4. The information recorder of claim 2, wherein the controller is further configured to write into the recording medium positional information indicating a position of the sector into which the data block is written.

5. The information recorder of claim 4, wherein the controller is configured to write the positional information into the recording medium after writing into the track group is finished.

6. The information recorder of claim 4, wherein, upon removing inter-track interference by using data read from a track adjacent to the target track on the recording medium while reading data from the target track, the controller is configured to read the data block written in the sector defined by the positional information instead of in the one or more sectors of the track adjacent to the target track that are overwritten as a result of the misalignment, to remove the inter-track interference.

7. The information recorder of claim 1, wherein the sector that is different from the sector into which data are written at the time the head is positioned off the target track, is disposed on the target track.

8. An information recording method for an information recorder comprising a recording medium configured to have data written thereon, a controller, and a storage module configured to temporarily store therein data written into a track adjacent to a track which is being written by a head, the information recording method comprising:
determining using the controller whether a position of a head for writing data on the recording medium is off a target track of the recording medium into which the head writes data, based on whether an amount of misalignment between a position of the head indicated by servo data associated with the target track and the target track is larger than a threshold value;
reading from the storage module, if it is determined that the head is positioned off the target track, a data block that is written in a sector that is among one or more sectors of the track adjacent to the target track that are overwritten as a result of the misalignment; and
writing, if it is determined that the head is positioned off the target track, the data block into a sector that is different from the sector into which data are written at the time the head is positioned off the target track.

9. The information recording method of claim 8, wherein
the recording medium comprises a track group in which track width is smaller than a width of the head and in which, when data are written into the target track with the head, data are overwritten in a portion of a track adjacent to the target track at an inner side or an outer side of the track adjacent to the target track in a circumferential direction is overwritten, and wherein
the writing further writes, if it is determined that the head is positioned off the target track, the data block read by the reading into a sector of a track included in the track group to which data is written at the time the head is positioned off the target track.

10. The information recording method of claim 8, wherein
the reading further reads, if it is determined that the head is positioned off the target track, a second data block written in a sector of the target track at the time the head is positioned off the target track, from the storage module, and
the writing further writes, if it is determined that the head is positioned off the target track, the second data block into a sector of the track adjacent to the target track.

11. The information recording method of claim 9, wherein the writing further writes into the recording medium positional information indicating a position of the sector into which the data block is written.

12. The information recording method of claim 11, wherein the writing writes the positional information into the recording medium after writing into the track group is finished.

13. The information recording method of claim 11, wherein, upon removing inter-track interference by using data read from a track adjacent to the target track on the recording medium while reading data from the target track, the reading further reads the data block written in the sector defined by the positional information instead of in the one or more sectors of the track adjacent to the target track that are overwritten as a result of the misalignment.

14. The information recording method of claim 8, wherein the sector that is different from the sector into which data are written at the time the head is positioned off the target track, is disposed on the target track.

* * * * *